A. SUNDH.
FLEXIBLE PIPE.
APPLICATION FILED MAR. 3, 1915.
1,179,577. Patented Apr. 18, 1916.
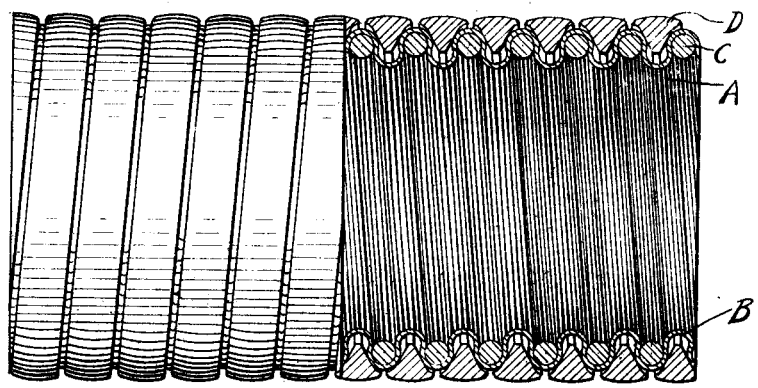
Fig. 1.
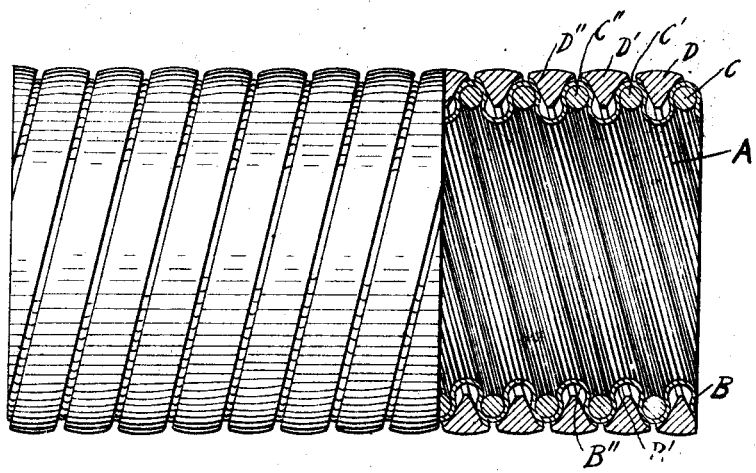
Fig. 2.
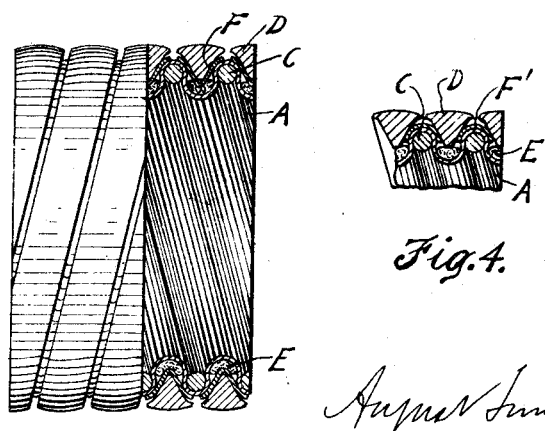
Fig. 3.
Fig. 4.

UNITED STATES PATENT OFFICE.

AUGUST SUNDH, OF HASTINGS-UPON-HUDSON, NEW YORK.

FLEXIBLE PIPE.

1,179,577.  Specification of Letters Patent.  Patented Apr. 18, 1916.

Application filed March 3, 1915. Serial No. 11,747.

*To all whom it may concern:*

Be it known that I, AUGUST SUNDH, a citizen of the United States, residing in Hastings-upon-Hudson, in the county of Westchester and State of New York, have invented a new and useful Improvement in Flexible Pipe, of which the following is a specification.

My invention relates to flexible pipe in general, but particularly to flexible pipe for use on railroad cars and the like for the transmission of air and steam for the air brakes and the heating system. Such pipe must be made to stand rough usage without leaking and to be flexible. My pipe is very strong and cannot leak. The wearing points are reduced to a minimum. My pipe differs from all other flexible pipe in being free from joints and necessary packing, which are ordinarily used, and which wear out rapidly, and still has all the advantages of spirally wound wire or strip pipe in reference to wear.

In the accompanying drawings, illustrating my invention, I have shown four figures.

Figure 1 is a part sectional elevation view of a section of my pipe; Fig. 2 is a part sectional view of another embodiment of my invention; Fig. 3 is a sectional elevational view of still another embodiment of my invention; and Fig. 4 is a cross sectional view showing a modification of Fig. 3.

Referring to the drawings in detail, in Fig. 1, I have shown a corrugated seamless metal pipe A, circular in cross section, and comprising spiral corrugations, B, extending its entire length. These corrugations are loop-shaped in cross section, this shape being preferable for my purpose, giving a greater flexibility to the pipe, and imparting to the pipe the properties of a diaphragm. On the inside of this pipe and fitting snugly the outwardly extending corrugations thereof, is a spiral wire, C, round in cross section, and of the proper pitch to correspond with the pitch of the spiral of the corrugations of the pipe. Surrounding the pipe A is a wire spiral D of the proper pitch to correspond with the pitch of the corrugations in the pipe. This wire spiral is V-shaped in cross section and lies in the inwardly extending corrugations of the pipe A, but a clearance is left between the bottom of the wire and the bottom of the corrugations.

Fig. 2 is identical with Fig. 1, excepting that I have here shown a multiplicity of spiral corrugations in the pipe A, as well as a multiplicity of spiral internal and external wires. The corrugations in the pipe A are indicated by B, B', B'', the inner wire spirals, C, C', C'', and the outer wire spirals, D, D', D''. This arrangement increases the tensility of the structure, which may be necessary in some cases.

Fig. 3 is identical in general with Fig. 2; but in this figure, I have shown a filling between the bottom of the outer wire spirals, D, D', D'', and the bottom of the corrugations in the pipe A. This filling, designated E, may be loose twisted hemp cord, asbestos, or any suitable material. This filling is loosely laid in this space and is for the purpose of helping to retain the shape of the corrugations of the pipe A. In the case of the use of this filling the pipe will not radiate heat as quickly when the pipe is used for heating systems. I have provided a wearing strip or strips, F, between the wire spirals, D, D', etc., and the corrugations, B, B', etc. These wearing strips are V-shaped in cross section, and preferably made of zinc or some metal softer than the corrugations of the pipe A, and will reduce the wear on both the corrugations of the pipe and the surrounding wire spirals D, D', &c.

In Fig. 4 I have shown a modification of these wearing strips, indicated by F'. In this figure the strips instead of being V-shaped are semicircular in cross section. This shaped strip is bent over the back of the corrugations in the pipe A and the V-shaped wire spirals rest on the strip. The nature of the wearing strips in both Figs. 3 and 4, is the same, but the strips of Fig. 4 is more advantageous than those in Fig. 3. In Fig. 3 the wear comes between the wearing strips and the corrugations of the pipe A, whereas in Fig. 4, the wear will take place between the strips and the wire spiral. This wear will not be as destructive to the whole apparatus as wear on the corrugations of the pipe, as the latter should be protected just as much as possible from any wear, whereas some wear on the wire spiral will not matter much.

In the construction I have shown and herein described, it should be noted that as the pipe is bent the inside round wire spirals will open up slightly on one side. The V-shaped wire spirals on the outside of the corrugations will be drawn in between the corrugations, on one side, and shoved out on the other, while the corrugations of the pipe will yield enough to accommodate the bending. Or in other words the wire spirals gives and takes properly and the corrugated pipe between the spirals will yield enough any way the pipe is bent. I am aware of course that flexible pipe made of wire spirals is old; and also that single corrugated pipe is old; but both kinds of pipe are unsatisfactory. The pipe made of wire spirals leaks, while the corrugated pipe cannot be made flexible enough without sacrificing so much of the strength of the pipe that it breaks quickly. With my structure I have overcome leakage and obtained a strong structure.

It is to be understood that where I specify wire spirals that wire strips made in proper shape may be used. For instance the outside V-shaped wire spirals I have shown might be made up of V-shaped strips, or the inner wire spirals might be semicircular in cross section instead of circular as I have shown. It is to be further understood that the corrugations of the pipe may be of any suitable shape which might be found to be best.

It is to be understood also that I may use steel or any other metal wire, although I have found that phosphor bronze wire is the most suitable for the inside spiral, phosphor bronze or copper for the corrugated pipe, and a softer metal, as zinc for the wearing strip. The outside wire spiral may be of steel or phosphor bronze or any suitable metal. Where heat like steam is transmitted through the pipe, it may be necessary to put an outside covering over the pipe to keep from burning the hands, but I have not shown an outside covering as the nature of the covering would depend on the use to which the pipe is put, and the covering does not form part of my invention.

In all events I do not desire to be limited to the exact details of construction and arrangement of parts shown, as has just been stated, various changes might be made therein without departing from the spirit and scope of my invention.

What I claim is:—

1. In a flexible metallic pipe, the combination of spirally wound wire spirals and a tube with corrugations, said corrugations forming two loops, one loop facing inwardly, and being free from contact with said spirals but held in position by said spirals, and one facing outwardly of the wall of the tube, the outwardly facing loop being interposed between said wire spirals at all times.

2. In a flexible metallic pipe, the combination of one inner wire spiral, and a corrugated pipe fitting over said wire spiral, and an outer wire spiral surrounding said first named spiral and holding the corrugated pipe in contact with the inner wire spiral.

3. In a flexible metallic pipe, the combination of one inner wire spiral, a corrugated pipe fitting over said wire spiral, one outside V shaped wire spiral surrounding said corrugated pipe and holding the outside corrugation of said pipe in contact with the inside wire spiral if the pipe be either straight or bent.

4. In a flexible metallic pipe, the combination of one inner round wire spiral, a pipe with corrugations to fit over said round wire spiral, one outside V shaped wire spiral surrounding said corrugated pipe and holding said outside corrugation of said pipe in contact with the inside round wire spiral if the pipe is either straight or bent.

5. In a flexible metallic pipe, the combination of one inner wire spiral and one outer wire spiral, a corrugated pipe interposed between said two spirals, the inward formed corrugations in said pipe being formed in a free loop, and filament in said corrugations.

6. In a flexible metallic pipe, the combination of one inner wire spiral and one outer wire spiral, a corrugated pipe interposed between said two spirals, the inward formed corrugations in said pipe being formed in a free loop, the two wire spirals being adapted to coöperate and maintain said inward formed free loop both when the pipe is straight and when it is bent.

7. In a flexible metallic pipe, the combination of one inner wire spiral and one outer wire spiral, a corrugated pipe interposed between said two spirals, the inward formed corrugations of said pipe being formed in a free loop, the two wire spirals being adapted to coöperate and retain said inward formed free loop both when the pipe is straight and when it is bent, and a resilient filament in said loop.

8. In a flexible metallic pipe, the combination of a corrugated tube forming one spiral loop turning outward, and one spiral loop turning inward, a round wire spiral fitting inwardly of the corrugated pipe in the outside loop, and a V shaped spirally wound wire spiral wedged against the outside loop holding the same yieldingly against the round wire spiral.

9. In a flexible metallic pipe, the combination of an inside wire spiral and an outside wire spiral, a corrugated pipe interposed between said spiral, and a metallic strip of softer material than the corrugated pipe and interposed between the outside wire spiral and the said pipe.

10. In a flexible metallic pipe, the combination of an inside wire spiral and an outside wire spiral, a corrugated pipe interposed between said spirals, and a strip of softer material than the corrugated pipe and interposed between the outside wire spiral and the said pipe.

11. In a flexible metallic pipe, the combination of one inner wire spiral and one outer wire spiral, a corrugated pipe interposed between said two spirals, the two wire spirals combined being the support of the corrugations and maintaining a free loop, and yielding filament in said free loop of the outside of the corrugation of the pipe, maintained in place by one of the wire spirals.

12. In a flexible pipe, the combination of spirally wound wire spirals and a corrugated tube interposed between said spirals, said corrugated tube forming loops turning inward and loops turning outward, the two wire spirals being in frictional engagement with one of said loops, and coöperating to maintain one loop free to yield when the pipe is bent in different directions.

13. In a flexible pipe the combination of spirally wound wire spirals and a corrugated tube forming two loops and interposed between said spirals, one of said loops being free from contact with said wire spirals.

14. In a flexible pipe the combination of spirally wound wire spirals and a corrugated tube interposed between said spirals, said corrugated tube forming two loops, one of said loops being free, the other being in engagement with one wire spiral on the outside and one wire spiral on the inside.

In testimony whereof, I have signed my name to this specification in the presence of two subscribing witnesses.

AUGUST SUNDH.

Witnesses:
 WALTER C. STRANG,
 JAMES G. BETHELL.